United States Patent [19]
Todd

[11] Patent Number: 5,012,449
[45] Date of Patent: Apr. 30, 1991

[54] SONIC FLOW METER

[75] Inventor: John D. Todd, Falmouth, Mass.

[73] Assignee: Ferranti O.R.E. Inc., Falmouth, Mass.

[21] Appl. No.: 374,265

[22] Filed: Jun. 30, 1989

[51] Int. Cl.$^5$ ............................................. G01S 15/00
[52] U.S. Cl. .................................... 367/89; 367/900; 73/861.18
[58] Field of Search ............... 367/89, 900; 73/861.18, 73/861.27, 861.28, 861.29, 861.31, 195, 24, 40.5 A; 364/510

[56] References Cited

U.S. PATENT DOCUMENTS

| | | | |
|---|---|---|---|
| 3,102,261 | 8/1963 | Wippert | 367/900 |
| 3,123,797 | 3/1964 | Ehrman | 367/97 |
| 3,548,370 | 12/1970 | Hoxsie | 367/900 |
| 3,618,007 | 11/1971 | Anderson | 367/900 |
| 3,683,324 | 8/1972 | Hoxsie | 367/900 |
| 3,685,046 | 8/1972 | Howlett | 364/421 |
| 4,028,938 | 6/1977 | Eck | 73/861.31 |
| 4,089,226 | 5/1978 | Kraska et al. | 73/901 |
| 4,198,702 | 4/1980 | Clifford | 367/900 |
| 4,318,105 | 3/1982 | Brodeur | 342/389 |
| 4,391,150 | 7/1983 | Rey | 73/861.29 |
| 4,754,650 | 7/1988 | Smalling et al. | 73/861.28 |
| 4,787,252 | 11/1988 | Jabobson et al. | 73/861.28 |

FOREIGN PATENT DOCUMENTS 1117635 2/1982 Canada.

Primary Examiner—Thomas H. Tarcza
Assistant Examiner—Daniel T. Pihulic
Attorney, Agent, or Firm—Nutter, McClennen & Fish

[57] ABSTRACT

A gain-controlled amplifier (24) in a sonic flow meter accepts an output signal from each transducer of a plurality of pairs of transducers (1a, 1b; 2a, 2b; 3a, 3b; and 4a, 4b) in sequence. A ramp generator (62) generates a time-varying-gain output, which increases between the transmission of a pulse by one transducer and the reception thereof by another. This time-varying-gain signal is one component of the amplifier's gain-control signal, which includes as another component an AGC value fetched from a memory (50) and rendered into analog form by a digital-to-analog converter (42). The value in the memory (50) is the difference between the time-varying-gain value and the value that other circuitry (30, 36) has determined to be necessary by monitoring the amplifier output produced during a previous operation of the same transducer pair. A third component of the gain-control signal is provided by further circuitry (40, 72, 76, 102), which acts to reduce the gain-controlled value if it determines that noise is present. It concludes that noise is present if the receiving transducer produces signal magnitudes that exceed a predetermined threshold before sound is expected from a transmitting transducer.

4 Claims, 6 Drawing Sheets

SONIC FLOW METER

FIELD OF THE INVENTION

This invention relates generally to the field of sonic flow meters and, more particularly, to a receiver for a sonic flow meter which can monitor the flow rates in multiple flow paths, each with widely different and varying characteristics.

BACKGROUND OF THE INVENTION

A sonic flow meter is an apparatus for measuring the flow rate of liquids through a channel. Typically, the meter includes at least two transducers, one transducer positioned upstream from the other transducer. The flow meter determines the flow rate of the fluid by transmitting pulses of sonic energy between the two transducers and by measuring the transit time of pulses through the fluid. When the fluid in the channel is stationary, the transit times of the pulses are the same, regardless of which direction the pulses travel through the fluid. However, when the fluid is moving, the motion of the fluid decreases the transit time of the pulses transmitted in the downstream direction and it increases the transit time of pulses transmitted in the upstream direction. The increase or decrease in the transit time is proportional to the flow rate of the fluid. Therefore, by measuring the difference between the upstream and downstream transit times, the flow meter can determine the flow rate of the fluid.

The flow rate V is related to the difference in transit time $(T_u - T_d)$ in the following way:

$$V = (T_u - T_d) D / 2 T_u T_d \cos x,$$

where D is the distance between the transducers and x is the angle that the sound-propagation path between the transducers forms with the fluid-flow direction.

A common way of measuring transit time is to count the number of cycles of a clock signal between the time at which the sonic pulse is transmitted and the time at which it arrives at the receiving transducer. Of course, the counts for the upstream and downstream measurements must start and stop at corresponding points in the transmitted and received signal pulses if the resulting flow-rate determination is to be accurate. In addition, the detector on the receiver end must not mistake noise for the received signal.

A threshold detector, which senses the received signal's crossing of a preselected threshold, is a conventional apparatus for satisfying these requirements. Generally, the threshold is set high enough that the ambient noise does not trigger the detector, but it is set low enough to detect the received signal. From threshold-crossing time and the signal amplitude, one can calculate the times at which the signal crosses the zero axis, and the actual arrival time of the signal can thus be determined.

When a threshold detector is used, however, the strength of the received signal affects the determination of arrival time. That is, a weak signal may appear to arrive later than a strong signal even though the actual transit times for the signals are identical. There are two reasons for this, both having to do with the shape of the received signal. Typically, the received signal is a series of oscillations that first increase and then decrease in amplitude. When the signal begins with a positive excursion followed by a negative excursion, the detector is generally set to determine the point in time at which the first negative excursion reaches a threshold level. If the signal is too weak, however, the receiver may miss the first negative excursion and detect a negative excursion of a subsequent cycle of the signal. The resulting measurement of transit time is then seriously in error.

Even if the receiver does not miss the first negative excursion, there is another reason why the weaker signal may appear to arrive later than the stronger signal. The slope of the strong signal at a zero crossing is greater than the slope of the weaker signal at its corresponding zero crossing. Thus, even though the two signals arrive at the same time as determined by their zero crossings, the weaker signal reaches the threshold level somewhat later than the stronger signal and thus appears to have a longer transit time. Of course, the error attributable to this factor is significantly smaller than the error attributable to missing the first negative excursion completely. Nevertheless, this error can be significant in some circumstances, such as those in which the distance between the transmitting and receiving transducers is relatively short.

To avoid the errors just described, flow meters generally employ gain-controlled amplifiers to produce a received signal of known amplitude for processing by the threshold detector to generate the flow-rate readings. The degree of amplification is selected to guarantee that the first negative excursion will be detected. And by carefully setting the amplitude of the amplified signal, thereby fixing the slope of the signal at its zero crossings, the actual transit times can be determined with a high degree of accuracy.

Changes in the environment in which the transducers are placed, however, may require recalibrating the flow meter to maintain accurate and reliable operation. For example, repositioning the transducers by moving them farther apart reduces the strength of the received signal. Unless the meter is recalibrated to account for the weaker signal, the resulting flow measurements may be erroneous. As a rule, a flow meter is calibrated for one set of transducers, and any recalibration must be done manually. Recalibration is therefore both time-consuming and inconvenient, and it requires a skilled technician using specialized test apparatus. Thus, conventional flow-meter circuitry cannot easily be used to monitor a number of other transducers in situations in which each set of transducers may be positioned in a different region of the channel or in a different channel.

Changes in the ambient temperature also tend to affect the accuracy of the meter readings, although to a much smaller degree than the changes mentioned above. The circuitry commonly used to provide threshold-level detection tends to be sensitive to temperature changes, so such changes affect the time at which the detector senses the arrival of the received signal. Techniques to compensate for such effects are available, but they add unwanted expense to the flow meter.

Another shortcoming of existing flow meters that operate as described above is their inability to operate reliably in the presence of noise. One type of noise is a change in the composition of the stream. If unwanted material, such as bubbles injected by a pump or debris floating down a river, is introduced into a stream being monitored, the strength of the received signal may be attenuated or become erratic. The change in the signal is likely to result in incorrect flow-rate readings and, if large enough, may lead to a complete loss of monitoring ability.

A second type of noise is the ambient acoustical signals that are often present in the channel. In an open channel such as a river, this noise may be generated by a passing motor boat or a turbine generator in a nearby power plant. In a closed channel such as a pipe in a chemical plant, it may be generated by a valve opening or closing or by a pump. Regardless of the source, acoustical noise of sufficient magnitude can completely obstruct the operation of the flow meter by providing a false signal that the meter treats as the received signal In summary, conventional sonic flow meters have numerous shortcomings that seriously limit their usefulness. The limitations are most acutely felt in hydro-plant applications, in which many flow rates must be monitored, the environment is constantly changing, and noise is common.

SUMMARY OF THE INVENTION

The invention is an improved flow-meter receiver circuit that is capable of monitoring different sets of transducers, each of which may be located in a different fluid conduit having potentially time-varying acoustical characteristics. The circuit automatically establishes and holds calibration for each set of transducers. It provides relatively high accuracy and noise immunity but low temperature sensitivity. In addition, the circuit generates a signal that provides information relating to compositional changes in each of the streams being monitored.

The flow meter includes a transmitter, a receiver, and a plurality of transducer pairs. The transmitter generates sonic pulses and sends them through a fluid channel between the two transducers of a selected transducer pair. Each pair of transducers defines a different sonic path. The receiver monitors the receiving transducer for received pulses, and the times of reception of the pulses are then used to determine the pulses' transit times, i.e., the times required for them to traverse the channel. To achieve satisfactory accuracy in the transit-time measurements, a variable-gain amplifier in the receiver first amplifies the received pulses to produce an amplified signal that has a predetermined amplitude. Determinations of the transit times are then based upon the amplified signal.

A TVG (time-varying gain) circuit and an AGC (automatic gain control) circuit together generate a signal that controls the gain of the amplifier so that it produces an amplified signal having the desired amplitude. The TVG circuit generates a first signal, which ramps up in amplitude during a, period between production of the sonic pulse and its expected reception. Thus, after each pulse is transmitted, the TVG circuit signal starts at an initial value and increases monotonically up to a final value that is determined by the separation of the two transducers. The AGC circuit generates a second signal that, when added to the final value of the first signal, causes the amplitude of the amplified signal to move closer to a reference signal that represents the desired amplitude of the amplified signal.

In accordance with one aspect of the invention, the AGC circuit includes a memory for storing an AGC value corresponding to each path. When the receiver receives a sonic pulse, the AGC circuit sets the gain of the receiver amplifier in accordance with a previously stored AGC value. The AGC circuit then compares the amplified signal with the reference signal, calculates a revised AGC value that will reduce the difference between the amplified signal and the reference signal, and stores the revised AGC value in a memory for use during the next cycle of that path. This operation is repeated for successive pulses until the amplified signal reaches the desired amplitude and the AGC values remain stable from pulse to pulse. In this way, the receiver automatically establishes the proper calibration of the receiver and generates a measure, i.e., the stored AGC value, of the acoustical characteristics of the fluid stream.

In accordance with another aspect of the invention, the receiver includes a noise detector and an attenuation circuit that control the AGC circuit. The noise detector senses the presence in the amplified signal of any component that exceeds a preselected threshold level and occurs before the expected time of arrival of the transmitted pulse at the receiving transducer. Such components constitute noise, and if the detector senses noise during a transmit-receive cycle, the attenuation circuit causes the AGC circuit to reduce the previously stored AGC value by a predetermined amount. Such reductions are repeated until the noise is no longer detected. When the noise is no longer detected, the AGC circuit functions in the manner previously described to raise the amplitude of the amplified signal back up to the desired level. Thus, the circuit desensitizes the receiver to detected noise by reducing the gain of the amplifier until the noise no longer exceeds the preselected threshold level. If the amplitude of the received sonic pulse is greater than the amplitude of the noise, the receiver continues to be capable of generating transit-time measurements in the presence of the noise.

According to another aspect to the invention, the receiver also includes what we call a "filter" circuit to improve the reliability and accuracy of the transit-time measurements. The filter comprises a first detector for detecting a first zero crossing of the amplified signal, a second detector for detecting the next zero crossing of the amplified signal, and a window-generator circuit. When the first detector detects the first zero crossing, the window-generator circuit enables a gate for a preselected period of time after the first zero crossing is detected. Only detection signals from the second detector which occur while the gate is enabled may be used to determine the transit time for the sonic pulse. Detection signals coming from the second detector during any other period of time are rejected. Since the zero crossings of the received signal provide a more accurate indication of the arrival time of the signal than do the non-zero-threshold crossings, the filter circuit enhances the performance of the receiver.

BRIEF DESCRIPTION OF THE DRAWINGS

This invention is pointed out with particularity in the appended claims. The above and further advantages of the invention may be better understood by referring to the following description in conjunction with the accompanying drawings, in which:

DETAILED DESCRIPTION OF THE PREFERRED EMBODIMENTS

Figure 1:
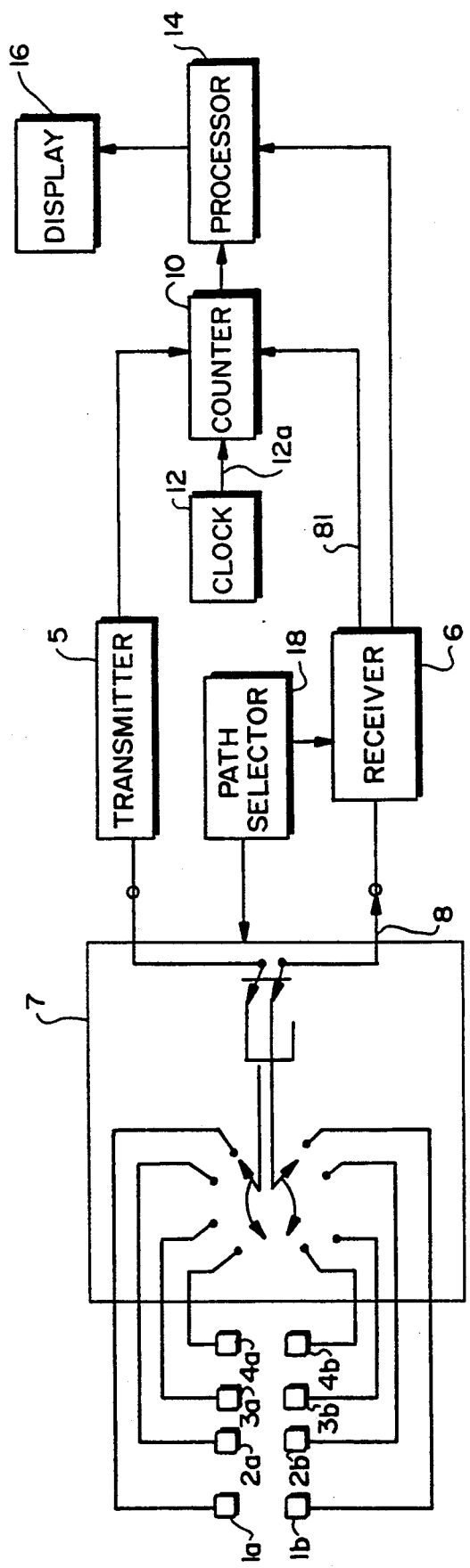
FIG. 1 is a block diagram of a sonic flow meter which embodies the invention.

FIG. 1 is a block diagram of a sonic flow meter including four transducer pairs 1a, 1b; 2a, 2b; 3a, 3b; and 4a, 4b. The flow meter uses at least one transducer pair in each conduit for which it is to take flow-rate data, and it may use more than one pair in a given conduit so as to take measurements in more than one path through the conduit. A transducer pair is placed in a fluid stream within the conduit of interest such that one transducer is upstream from the other transducer. The flow meter then transmits sonic pulses between the two transducers, first in one direction, for example, an upstream direction, and then in the other direction, namely, the downstream direction, to measure an upstream transit time and a downstream transit time of sound through the moving fluid. The difference between the upstream and downstream transit times is used to calculate the flow rate for the fluid stream.

Each transducer of a pair may act as a transmitting transducer or a receiving transducer depending upon whether the meter is measuring the upstream or the downstream transit-time at that moment. A switch 7 selects the particular transducer pair which is to provide the transit-time measurements, and within the pair it selects the transmitting transducer and the receiving transducer.

The flow meter includes a transmitter 5, which produces signals for the transmitting transducer 1a, and a receiver 6, which monitors signals from the receiving transducer 1b. The transmitter 5 drives the transmitting transducer 1a, causing it to produce a short pulse of sonic energy that propagates through the fluid toward the receiving transducer 1b. In the embodiment described herein, the frequency of the sonic pulse is between 100 kHz and 1 MHz. The receiver 6 monitors the receiving transducer 1b by way of line 8, and it signals the time of arrival of the transmitted sonic pulse.

The flow meter also includes a counter 10, which measures the transit times of the transmitted sonic pulses. Transmission of the sonic pulse resets a counter 10 and causes it to begin counting. When the receiver 6 detects the arrival of a transmitted pulse, it stops the counter 10, thereby producing a measure of the transmitted pulse's transit time. The transit-time information from the counter 10 is then passed to a processor 14. The receiver also sends the processor information, to be described below, from which the processor determines whether to accept the counter output as a reliable indication of pulse transit time.

Switch 7 then reverses the sending and receiving functions of transducers 1a and 1b, and the foregoing procedure is repeated. After the processor 14 has received both the upstream transit time and the downstream transit time, it calculates the flow rate for the channel. The processor typically uses the calculated flow rate for further processing, and it may also send it to other systems such as a display system 16, which displays it to the flow-meter operator.

A path-selector circuit 18 selects a signal path for a particular transit-time measurement and causes the switch 7 to make the proper connections. That is, the selector circuit selects the transducer pair, e.g., transducers 1a and 1b, that will generate the desired transit-time information. Within the selected pair, it determines which transducer is to transmit and which one is to receive.

Figure 2:
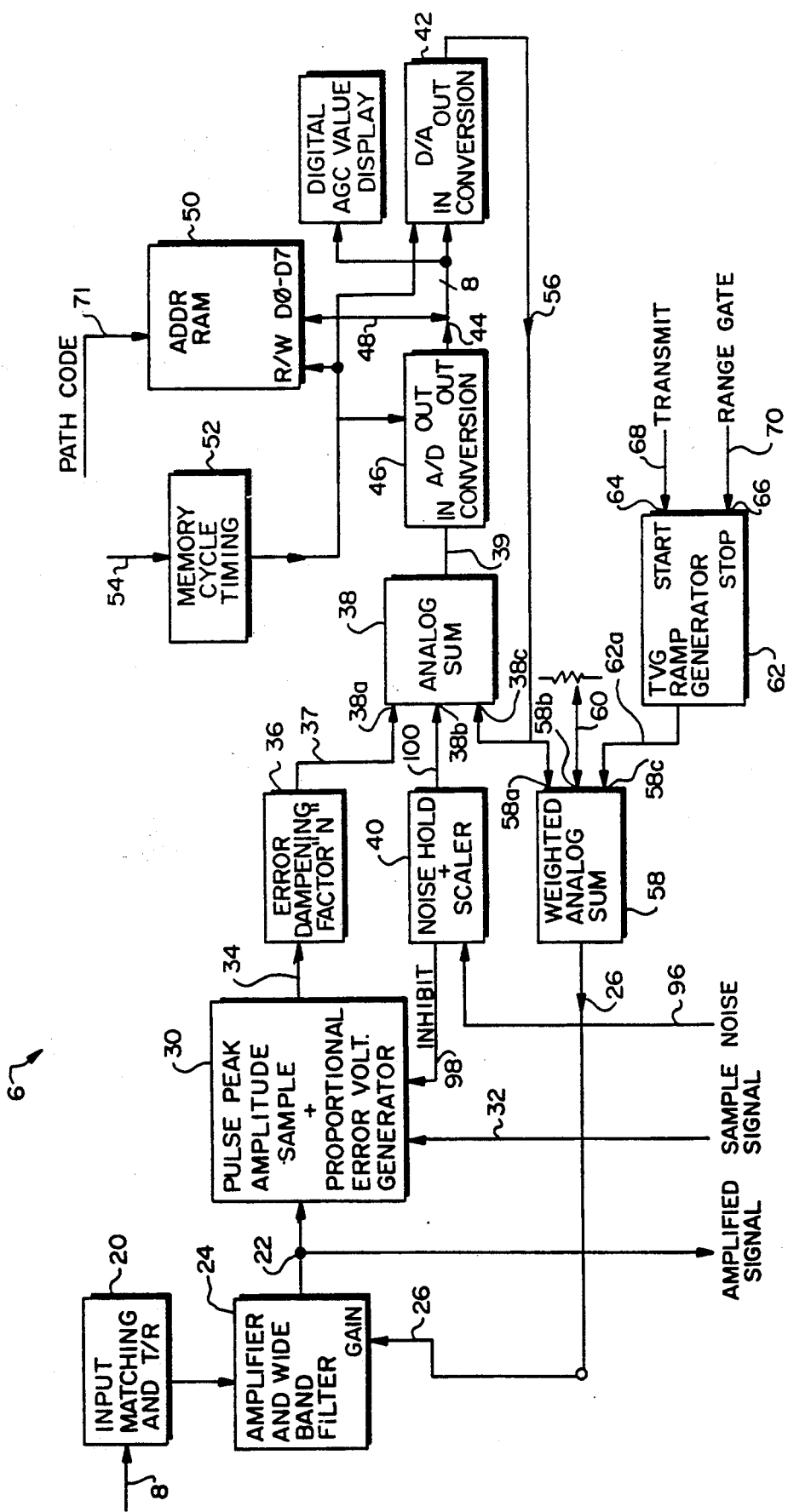
FIG. 2 is a block diagram of a portion of the receiver shown in FIG. 1.

FIG. 2 is a block diagram of a portion of the receiver circuit 6. As illustrated, the receiver 6 includes an input matching circuit 20 followed by a voltage-controlled variable-gain amplifier 24. The matching circuit 20 serves at least two purposes. First, it limits the maximum amplitude of the signal which is permitted to reach the amplifier 24. This prevents a strong, unwanted signal such as noise or the drive signal of the transmitter 10 from overloading the amplifier 24 and thereby temporarily disabling it. Second, it matches the impedance of the transducer 1b and the amplifier 24 to maximize the signal power that the amplifier 24 receives. The amplifier 24 amplifies the signal from the matching circuit 20 to produce an amplified signal on line 22. The receiver 6 uses the amplified signal 22 to detect the arrival of the transmitted pulse and to stop the counter 10, shown in FIG. 1.

Figure 3:
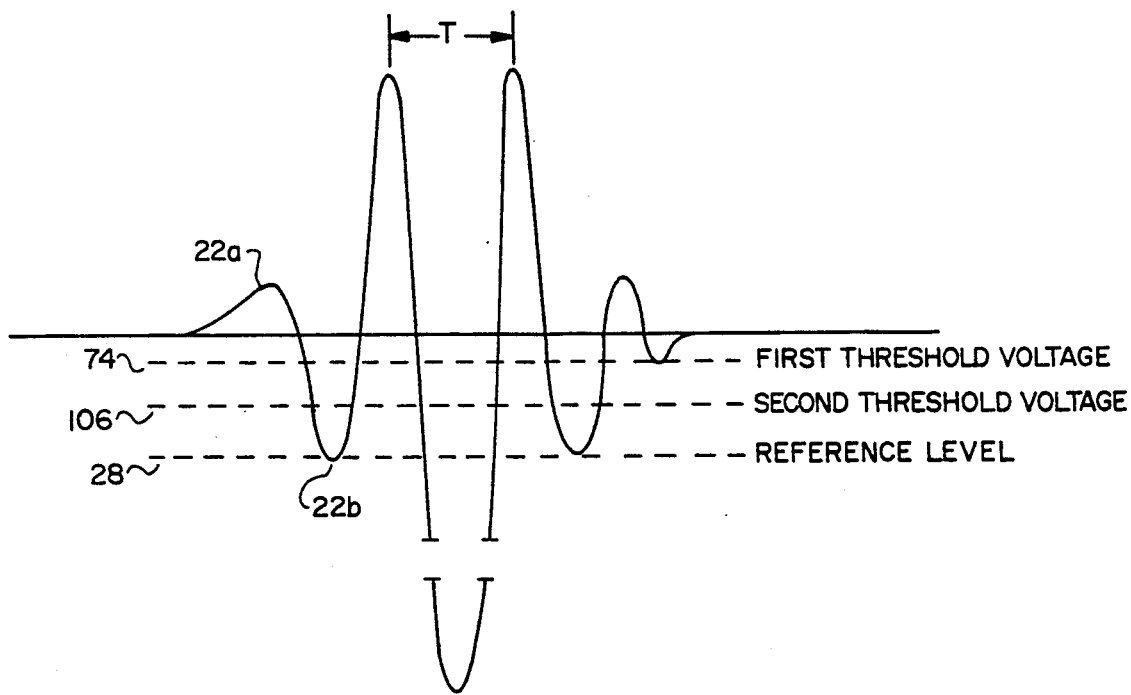
FIG. 3 is a representative example of an amplified signal.

The amplified signal on line 22 generally has a waveform such as that illustrated in FIG. 3. The signal 22 consists of a series of oscillations that first increase in amplitude and then decrease in amplitude. The period T of each cycle in the signal is, of course, the reciprocal of the carrier frequency of the sonic pulse. The transmitter 5 drives the transmitting transducer 1a so as to generate an amplified signal 22, which, as a rule, has a first peak 22a of a predictable polarity. For purposes of the following description, the polarity is positive. In other words, each amplified signal has a positive first peak 22a followed by a negative second peak, which is referred to hereinafter as the first negative peak 22b. In the first embodiment of the invention described herein, the time at which the pulse is considered to arrive—i.e., the time at which the counter 10 stops—is that of the occurrence of this first negative pulse 22b, and the amplifier gain is controlled so as to keep the amplitude of this peak at a reference level.

Specifically, a gain-control signal on line 26 controls the gain of the amplifier 24 and thus the magnitude of the oscillations in the amplified signal on line 22. After receiving each transmitted pulse, the receiver 6 adjusts the gain-control signal on line 26 for the next received signal until the oscillations of the amplified signal on line 22 have a desired amplitude. The receiver 6 accomplishes this by first determining the difference between the amplitude of the first negative-going peak 22b and a reference level 28 (FIG. 3), which represents the desired amplitude of the first negative-going peak 22b, and then adjusting the gain of the amplifier 24 to reduce the difference which will be observed for the next received pulse on the selected path. As shown in FIG. 2, the receiver circuitry that performs this function includes an error-voltage generator 30.

The error-voltage generator 30 determines the amplitude of the first negative-going peak 22b by employing conventional sample-and-hold techniques. As will be described in more detail below, a sample signal on line 32 causes the error-voltage generator 30 to begin sampling the amplified signal 22 as soon as the receiver 6 detects that the received pulse has started. After approximately one quarter of the period of the first oscillation, i.e., T/4, has elapsed, the sample signal 32 causes the generator 30 to hold the amplitude of the amplified signal 22 existing at that point in time. The generator 30 then compares the sampled level to the reference level 28 (FIG. 3) and generates an error signal 34 proportional to the difference between the two levels. If the sampled level is greater than the reference level 28, the error signal 34 is negative, causing the gain of the amplifier 24 to be decreased for the next received pulse. If the sampled level is less than the reference level 28, on the other hand, the error signal 34 is positive, causing the gain of the amplifier 24 to be increased for the next received pulse.

When the sampled voltage is zero, the error-voltage generator 30 produces an error signal on line 34 having maximum error value. After each non-zero sample, the error signal 34 of the generator 30 slowly decays toward the maximum error value. The time constant of the decay is substantially longer than the period of one oscillation of the sonic pulse but is small enough that the error signal 34 will be approximately equal to the maximum value by the time the next pulse is transmitted.

A damping circuit 36, whose purpose will be explained presently, attenuates the error signal 34 before sending it to a first analog sum circuit 38. The first analog sum circuit 38 has three input ports 38a, 38b, and 38c. Input port 38a receives the attenuated error signal from the damping circuit 36, and the other two input ports 38b and 38c receive output signals from a noise hold and scaler circuit 40 and a D/A converter 42, respectively, both of which will be described shortly. The analog sum circuit 38 adds its inputs to produce a first analog signal on line 39, which is then converted to a digital AGC value on line 44 by an A/D converter 46. In this embodiment, the digital AGC value is an eight-bit-wide signal. The digital AGC value from line 44 propagates by way of lines 48 to a RAM 50, which, under control of a memory-cycle timing circuit 52 triggered by a signal on line 54, stores that value for use in a later cycle, in which the memory-cycle timing circuit causes it to be fetched and to be converted to analog form by the D/A converter 42.

The D/A converter 42 converts the digital AGC value on line 44 back to a second analog signal on line 56. The second analog signal is fed back to input port 38c of the analog sum circuit 38, where it is added to the modified error signal on line 37 to generate the next revised digital AGC value 44 for the selected path. The second analog signal is also sent to a second analog sum circuit 58, which produces the gain-control signal on line 26.

The second analog sum circuit 58 has three input ports 58a, 58b, and 58c. Input port 58a receives the second analog signal 56, input port 58b receives a fixed gain signal 60, which is externally set to a constant value, and input port 58c receives a TVG output signal 62a from a TVG ramp generator 62. The gain control signal 26 may be a weighted sum of these three signals.

The TVG generator 62 produces a TVG output signal on line 62a that ramps up from an initial value to a final value after each transmission of a sonic pulse. The generator 62 has a start input port 64 and a stop input port 66. The start input port 64 receives a transmit signal on line 68, which marks the time at which the transmitter 5 transmits the sonic pulse. The stop input port 66 receives a range-gate signal on line 70 which establishes the period during which the TVG output signal 62a ramps up. The range-gate signal on line 70 is initially low, it goes high prior to the transmit signal on line 68, and then it returns to low just before the transmitted pulse reaches the receiver transducer 1b, marking the end of the range gate. In other words, the duration of range gate is adjusted to correspond to the transit time or, equivalently, to the distance between the transmitting transducer 1a and the receiving transducer 1b.

Before the TVG ramp generator 62 receives the transmit signal 68, the TVG output signal 62a is at the initial value. Upon receiving the transmit signal 68, the TVG output signal 62a begins ramping up until the generator 62 receives the signal marking the end of range gate. At the end of range gate, the ramping stops, and the generator 62 holds a final value determined by the duration of the range gate. The TVG output signal on line 62a is returned to the initial value before the next transmit signal 68, and the process is repeated for the next transmit-receive cycle.

The gain-control portion of the circuit operates as follows. Assume that the stored AGC value for the selected path is less than required to achieve the desired amplitude of the amplified signal 22. Also assume that no noise is present, so the output of the noise hold and scaler circuit 40 is zero. (The noise hold and scaler circuit 40 will be described later.) After a sonic pulse is transmitted on a selected path, the TVG output signal on line 62a ramps up to and holds its final value, which is determined by the length of the range gate. In the meantime, the memory-cycle circuit 52 causes the RAM 50 to produce on line 48 the digital AGC value stored at a location identified by a path code on line 71 corresponding to the selected path. The D/A converter 42 converts the digital AGC value on line 48 to a corresponding analog value, which propagates over line 56 to the second analog sum circuit 58. The second analog sum circuit 58 adds the final value of the TVG output signal on line 62a, the fixed gain signal on line 60, and the second analog signal on line 56 to produce the gain-control signal 26, thereby setting the gain of the amplifier.

It should be understood that the duration of the range gate increases in proportion to the separation of the two transducers 1a and 1b, so the final amplitude of the TVG output signal 62a also increases in proportion to the separation of the two transducers. In this way, the receiver compensates for the increased signal attenuation associated with moving the transducers farther apart and thus reduces the dynamic range required of the circuit's AGC function.

In response to an appropriately timed sample signal on line 32, the error-voltage generator 30 samples the amplified signal on line 22 and produces an error signal on line 34 corresponding to the difference between the reference level and the amplitude of the first negative-going peak of the amplified signal on line 22. Since by assumption the initial AGC value was less than required, the error voltage generator 30 will produce a positive error signal on line 34, causing the stored AGC value to be increased. After the damping circuit 36 attenuates the error signal on line 34 by a preestablished amount, the first analog sum circuit 38 adds the modified error signal on line 37 and the second analog signal on line 56, which corresponds to the stored AGC value, to generate a first analog signal on line 39.

The memory-cycle timing circuit 52 then causes the RAM 50 to release the bus 48 and concurrently causes the A/D converter 46 to convert the first analog signal 39 to the revised digital AGC value and place it on the bus 48. The RAM 50 then writes this revised digital AGC value into the memory location which had been occupied by the previously stored digital AGC value for the selected path.

In short, the receiver 6 examines the magnitude of the amplified signal 22 corresponding to a transmitted pulse, compares it with the desired magnitude for the amplified signal, and then revises the stored AGC value in the RAM 50 so that the amplified signal for the next transmitted pulse along the selected path moves closer to the desired magnitude.

The attenuation factor N of the damping circuit 36 is typically less than one. If N were equal to one, the stored AGC values would reach the desired value after the first received pulse is examined. The receiver 6, however, would be more sensitive to noise and prone to oscillation. Selecting an attenuation factor which is less than unity reduces the receiver's sensitivity to noise and its susceptibility to oscillation, although it additionally makes it necessary for the receiver to examine several received pulses on a selected path in order to arrive at a final stable AGC value.

Figure 4:
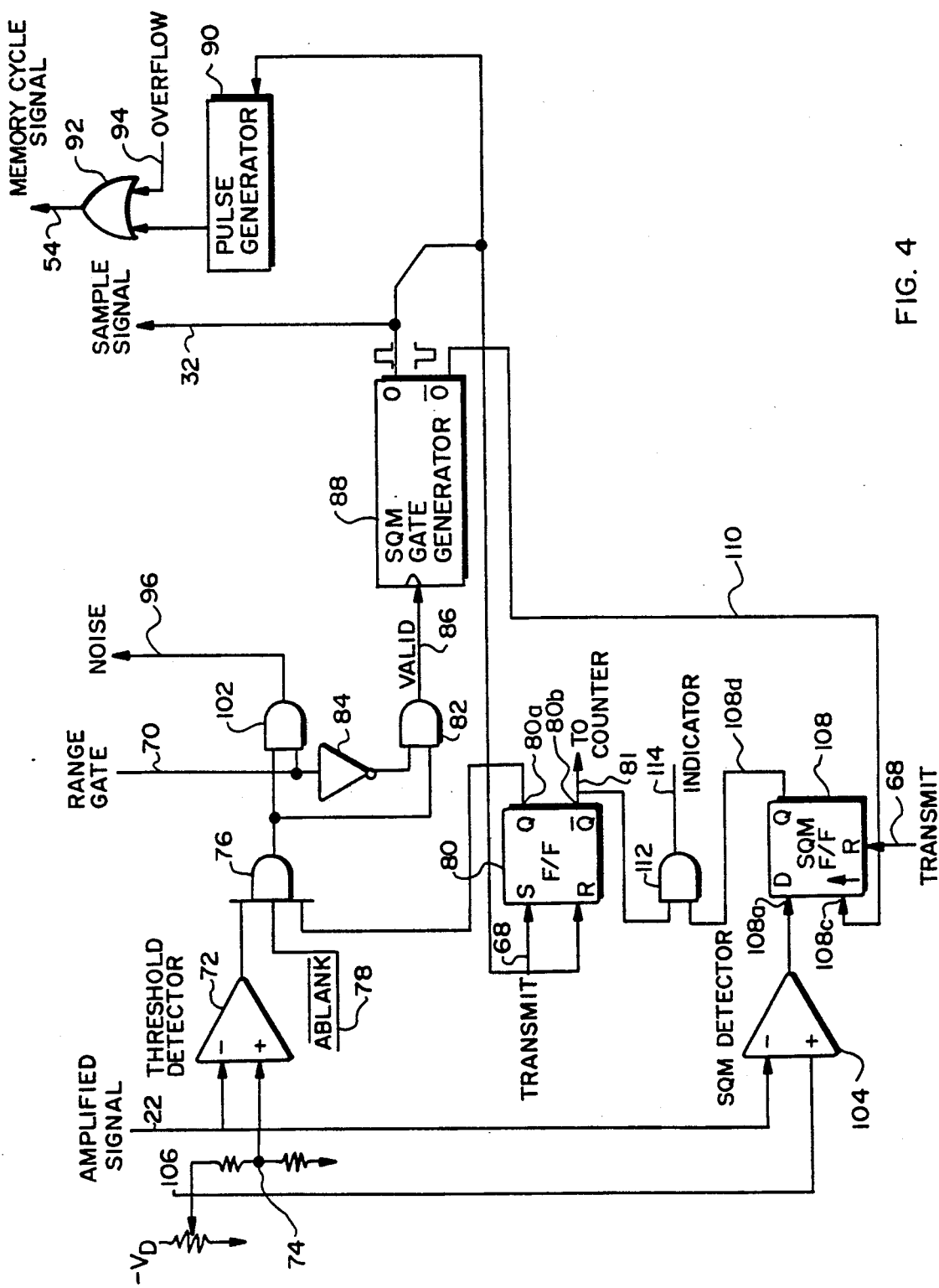
FIG. 4 is a block diagram of the control circuitry within the receiver shown in FIG. 1.

With the aid of FIG. 4, the portion of the receiver circuitry that controls the error-voltage generator 30, the memory-cycle timing circuit 52, and the counter 10 (shown in FIG. 1) will now be described. As illustrated in FIG. 4, the receiver also includes a threshold detector 72, which senses when the receiving transducer 1b has received a sonic pulse. The threshold detector 72 is a differential amplifier. One of its inputs is the amplified signal on line 22. The other input is a first threshold voltage 74. A received pulse is deemed to have begun when the amplified signal first goes more negative than the first threshold 74 (FIG. 3) and the output of the threshold detector 72 has thus become high.

The threshold-detector output is one input of a three-input AND gate 76, which receives the two other inputs. One is an inverted ABLANK signal on line 78. The ABLANK signal is asserted when it is expected that the receiving transducer will detect extraneous signals. For example, when the sonic pulse is transmitted, it is likely that the receiving transducer will pick up the transmission signal directly from the transmitter circuitry. To prevent the receiver circuit from responding to this extraneous signal, the ABLANK signal is asserted during transmission to mask such signals. The Q output 80a of a flip-flop 80 is the remaining, third input of the AND gate. The Q output at port 80a is normally high but goes low immediately after the output of AND gate 76 goes high in response to a received pulse.

The output of the three-input AND gate 76 is one input of another AND gate 82. The range-gate signal on line 70, after being inverted by an inverter 84, is the other input of AND gate 82. Thus, the VALID output of gate 82 on line 86 goes high to indicate receipt of the signal only if the amplified signal on line 22 is more negative than the first threshold after the end of the range gate, i.e., after a time at which the pulse might begin to be expected.

The positive-going transition of the VALID signal 86 causes the output of a one-shot, gate generator 88, to assume its unstable high state for slightly less than T/4, after which it goes low. This period is the time it takes for the signal to reach the first negative peak after the threshold is detected, and the Q output of the gate generator 88 is the sample signal on line 32 that causes the error voltage generator 30 shown in FIG. 2 to sample the amplified signal on line 22.

The up-transition of the sample signal on line 32 also resets flip-flop 80, with the following results. First, the Q output of the flip-flop 80 goes to low, thereby disabling the three-input AND gate 76 and shielding the gate generator 88 from all subsequent signals coming from the threshold detector 72. Secondly, the Q complement output of the flip-flop 80 changes from low to high, thereby producing a signal on line 81 that stops the counter 10. Prior to the next transmission, the flip-flop 80 is reset by the TRANSMIT signal 68 so that the circuit is ready to react to the next received signal.

In summary, the circuitry that controls the gate generator 88 works as follows. The threshold detector 72 responds to any signal appearing at the output of the amplifier 24 which goes more negative than the first threshold voltage 74. The three-input AND gate 76 prevents the output of the threshold detector from reaching the gate generator 88 as long as the ABLANK signal is asserted, thereby shielding the circuit from known extraneous signals. Similarly, AND gate 82 prevents the output of the threshold detector 72 from reaching the gate generator 88 during the range gate, thereby shielding the circuit from noise during that time interval. After the end of range gate, however, the output of the threshold detector 72 is able to reach the gate generator 88. Thus, when the detector 72 detects the arrival of the sonic pulse and its output thereby changes from low to high, it causes the gate generator 88 to produce the sample signal on line 32. The rising edge of the sample signal 32 resets flip-flop 80, causing a low-to-high transition in its Q-complement output so as to stop counter 10 at a count that represents the pulse transition time. Simultaneously, the Q output assumes a high value so the three-input AND gate 76 again shields the gate generator 88 from all signals that come from the threshold detector 72 until the next TRANSMIT signal on line 68 sets flip-flop 80.

In response to the falling edge of the sample signal on line 32, which marks the end of the sample period, a pulse generator 90 produces a short-duration pulse, which an OR gate 92 forwards to the memory-cycle timing circuitry 52 of FIG. 2 to cause the A/D converter 46 to convert the revised AGC value to digital form and causes the RAM 50 to store the resultant digital value into the memory location identified by the path code 71 (FIG. 2).

The other input to OR gate 92 is the OVERFLOW signal, which circuitry not shown in the drawings generates if a received signal has not been detected within a predetermined time interval after the sonic pulse was transmitted. The predetermined interval is selected to be greater than the expected transit time for the pulse. If the gain of the amplifier 24 is initially too low, it is possible that none of the peaks of the amplified signal will be more negative than the first threshold voltage 74, and the threshold detector 72 will not detect the received pulse. Thus, the threshold detector 72 will not trigger the generation of the sample signal 32. In that case, the OR gate 92 forwards the OVERFLOW signal over line 54 to the memory-cycle timing circuit 52, thereby causing a revised AGC value to be written into the RAM 50. Since the error voltage generator 30 does not receive a sample signal 32 for the last transmitted pulse, the error signal 34 will be approximately equal to the maximum error value. This causes the revised AGC value to be greater than the last stored AGC value, so the gain of the amplifier 24 for the next transmitted sonic pulse increases.

After enough transmit-receive cycles have been performed on the selected path, the gain of the amplifier 24 will increase to a level high enough to generate an amplified signal 22 that the threshold detector 72 can detect. It is likely, however, that the threshold detector 72 will first detect one of the larger negative pulses that occur after the first negative pulse. To assure that the receiver synchronizes on the first negative pulse, the reference level 28 (FIG. 3) is set to be approximately 16$db$ above the first threshold voltage 74. Thus, if there is a negative pulse before the one that the threshold detector 72 is sensing, its amplitude will rise above the first threshold level as the peak of the detected pulse rises towards the reference level. In this manner, the receiver finds and triggers on the first negative-going peak of the amplified signal 22.

As was described in connection with FIG. 2, the receiver 6 operates in such a manner that the first negative peak gravitates to the reference level 18. A signal of that magnitude results in optimum measurement accuracy. Although the amplified signal tends toward that optimum magnitude, however, changes in conditions can cause the magnitude to vary, possibly to the extent that measurement accuracy is unacceptable. To reduce the effects of such changes, the circuitry of FIG. 4 includes "SQM" (signal-quality measurement) circuitry, including an SQM detector 104, an SQM flip-flop 108, and an SQM gate 112, which provides the processor 14 (FIG. 1) with an indication of the likely accuracy of the transit-time measurement that it receives from the counter 10.

The SQM detector 104 compares the amplified signal 22 with a second threshold voltage 106. (See also FIG. 3.) The SQM detector 104 is an operational amplifier which produces a low output when the amplified signal 22 is more positive than the second threshold voltage and a high output otherwise. The output of the SQM detector 104 is the D input of a D-type flip-flop 108. At the expected time of occurrence of the first negative peak 22$b$, a positive-going edge at the clock terminal 108$c$ of flip-flop 108 causes it to store the value then at its D input port 108$a$ and place this value on its output line 108$d$, holding it there until reception of a resetting TRANSMIT signal on line 68. The output of the SQM flip-flop 108 thus indicates whether the first negative peak was of sufficient magnitude to be reliable. This output on line 108$d$ is one input of an AND gate 112, whose other input is the Q-complement output of flip-flop 80 and is thus high from the reception of the pulse to the end of the cycle. The INDICATOR output of AND gate 112 is thus an indication of whether the currently received pulse is "good," as determined by the magnitude of its first negative peak. If the pulses received from a given transducer pair for both the forward and the reverse measurements are good, the processor 14 makes a velocity determination from those measurements. Otherwise, the processor "ignores" the counter output, since that output is likely to be inaccurate.

As noted above in reference to FIG. 2, the receiver embodying the invention also includes the noise hold and scaler circuit 40. When noise is detected, the scaler circuit 40 imposes a downward adjustment of the stored AGC value to reduce the receiver's sensitivity to noise. The scaler circuit 40 monitors a NOISE signal line 96 for a high state, which indicates that noise has been detected. When it detects the high state, the scaler circuit 40 sends an INHIBIT signal on line 98 to the error-voltage generator 30 and sends a noise-attenuation signal on line 100 to the first analog sum circuit 38. The INHIBIT signal 98 prevents the error-voltage generator 3 from responding to the sample signal 32 and thus allows the error signal on line 34 to continue its decay toward its maximum error value. The polarity of the noise-attenuation signal on line 100, on the other hand, is opposite that of the maximum error value. Its magnitude is preselected so that, when the analog-sum circuit 38 adds it to the maximum error value, the output on line 39 causes a decrease in the AGC value stored in the RAM 50.

An AND gate 102 generates the NOISE signal t which noise hold and scaler 40 reacts. This signal is high if the amplified signal on line 22 exceeds the first threshold 74 during the range gate on line 70—i.e., during the period before the received pulse is expected. Specifically, AND gate 102, which is controlled by the range-gate signal on line 70, monitors the output of the three-input AND gate 76. After a transducer has transmitted a pulse, and while the range gate is still on, both the three-input AND gate 76 and AND gate 102 are enabled and thus allow any output of the threshold detector 72 to pass to the NOISE signal line 96. Consequently, if the threshold detector 72 senses noise during the range-gate period, it causes the NOISE line 96 to go to a high state, which indicates the presence of noise and thereby causes the noise-hold-and-scaler circuit 40 to reduce the amplifier sensitivity in the manner just described.

Figure 5:
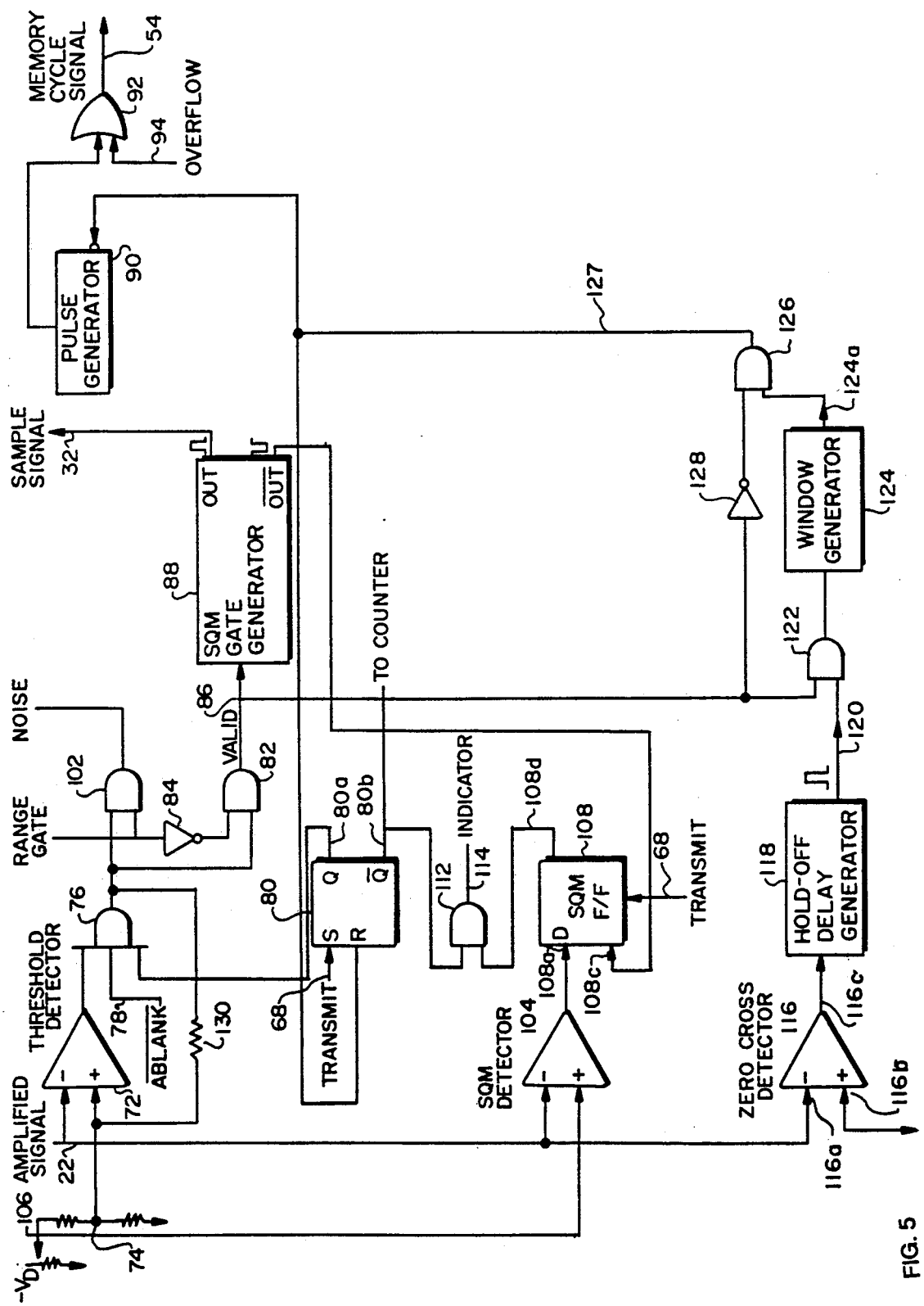
FIG. 5 is an alternative embodiment of the control circuitry shown in FIG. 4.

FIG. 5 depicts an alternate embodiment of the present invention. In addition to the circuit elements described in connection with FIG. 4 and correspondingly numbered in FIG. 5, the circuit of FIG. 5 includes further elements, which increase measurement accuracy. Unlike the arrangement of FIG. 4, in which the gate-generator one-shot 88 triggers flip-flop 80, and thus stops the counter 10, a fixed time period after the amplified signal reaches the first threshold 74, that of FIG. 5 employs the additional elements to trigger flip-flop 80, and thus stop counter 10, at the first positive-going zero crossing of the amplified signal. Unlike the times of occurrence of threshold-crossing points, upon which the FIG. 4 arrangement bases its termination of the transit-time measurement, the times of occurrence of zero-crossing points do not depend upon the amplitude of the oscillations. Thus, they provide a more reliable indication of the times of pulse arrival at the receiving transducer.

In the FIG. 5 arrangement, a zero-crossing detector 116 provides a high output where the amplified signal 22, which it receives at its inverting terminal 116$a$, is below the ground level presented to its non-inverting terminal 116$b$. Otherwise, the detector output on line 116$c$ is low. A hold-off-delay generator 118 monitors the signal on output line 116$c$. The output of the generator 118 is normally low. When it receives a low-to-high transition, however, the generator 118 produces on its output line 120 a short pulse delayed from the transition by slightly less than half the period of the transmitted frequency; i.e., it produces a pulse shortly before the next positive-going zero crossing is expected. The delayed pulse passes to an AND gate 122, which is controlled by the VALID signal on line 86. If the VALID signal is high and thereby indicates that the amplified signal on line 22 has reached the first threshold voltage, AND gate 122 permits the short pulse to pass to the input port of a window-generator circuit 124.

The window generator is a monostable multivibrator whose output is normally low. When the window generator 124 receives the delayed pulse from the delay generator 118, it raises the signal on its output line 124a to a high state for a short preset interval and then returns it to a low state. The duration of the preselected interval is chosen so that the signal on output line 124a will be high for an interval that brackets the expected time of occurrence of the next positive-going zero crossing.

The signal on the output line 124a passes to an AND gate 126, whose other input is the output of an inverter 128 that inverts the VALID signal 86 to produce a signal that, as will be explained presently, goes high upon the positive-going zero crossing of the amplified signal. If that zero crossing occurs during the window defined by the output of the window generator 124, therefore, AND gate 126 produces a low-to-high transition in response. This transition on the output line 127 of AND gate 126 resets flip-flop 80, and the subsequent high-to-low transition triggers the pulse generator 90.

In contrast to the flip-flop 80 and pulse generator 90 of FIG. 4, therefore, the corresponding elements in FIG. 5 receive the output of gate 126, whose output represents actual detection of a zero crossing, rather than the output of the gate generator 88, whose output represents a prediction of a negative peak. An additional difference between the two embodiments is that the output of the three-input AND gate 76 of FIG. 5 is fed back to the non-inverting input terminal of the threshold detector 72 through a resistor 130. This has the effect of pulling the first threshold voltage 74 to zero volt when the output of the three-input AND gate 76 is high. As will now be explained, this is what causes the tracking edge of the VALID signal to occur on a zero crossing so that the output of gate 126 represents an actual zero crossing.

Figure 6:
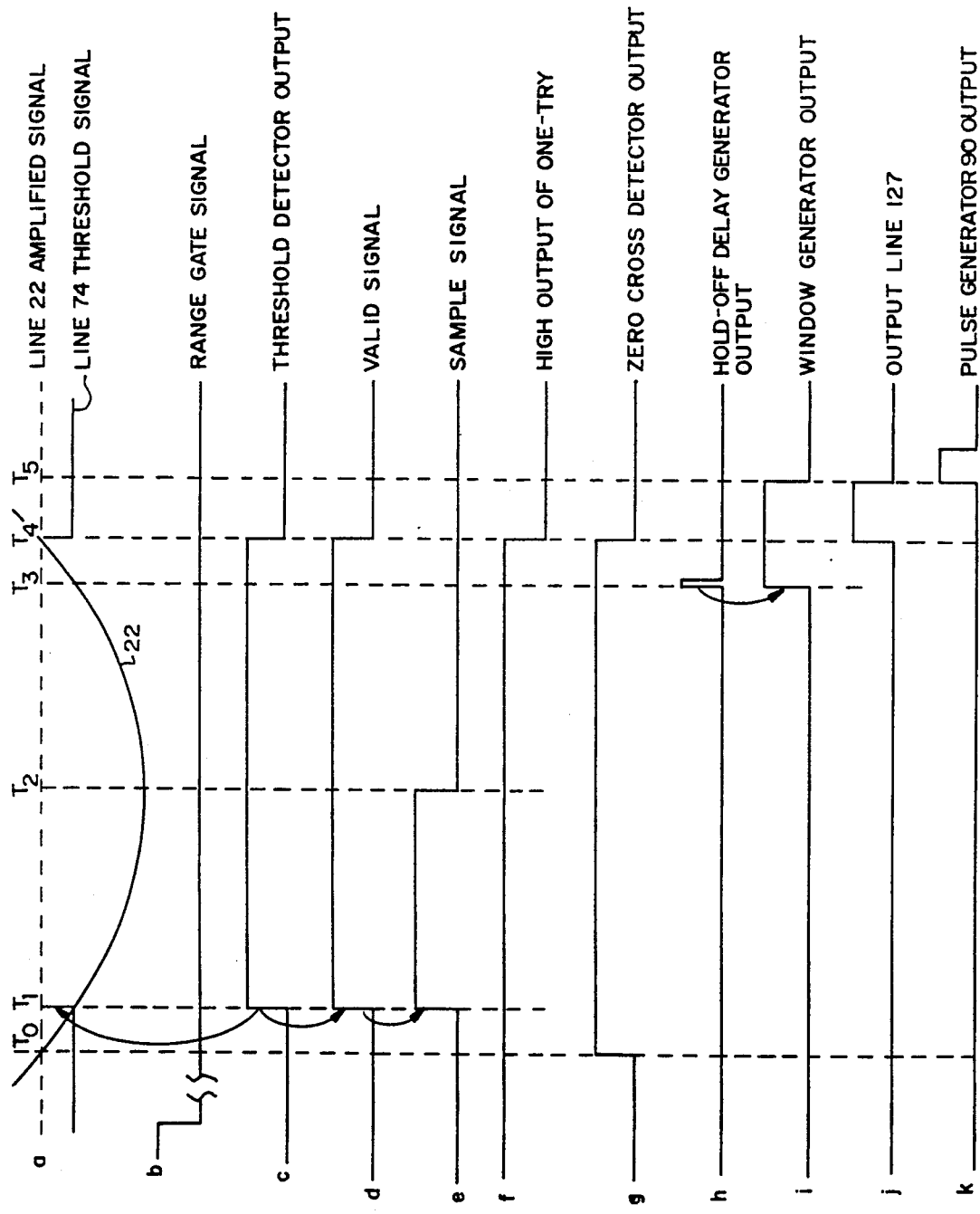
FIG. 6 is a timing diagram of the signals generated in the embodiment illustrated in FIG. 5.

With the zero-cross detector 116 in the circuit, the receiver operates as illustrated in the signal timing diagrams shown in FIG. 6. Before the transmitted pulse arrives, the range-gate signal on line 70 will have ended, as FIG. 6b illustrates. Furthermore, the inverted ABLANK signal on line 78 will no longer be low, and the TRANSMIT signal on line 68 will have issued. As the first negative pulse 22b of the amplified signal on line 22 occurs, the zero-crossing detector 116 senses at time $T_0$ the signal transition from positive to negative and raises its output on line 116c to a high state, where it remains until time $T_4$, when the signal crosses zero in the positive direction. (See FIG. 6g.) The transition of the output of the zero-crossing detector 116 to the high state starts the delay generator 118, which responds by generating a pulse after a preset time has elapsed, namely, at time $T_3$, as FIG. 6h illustrates.

At a time $T_1$ after $T_0$, the amplified signal on line 22 crosses the first threshold voltage 74, thereby causing the output of the threshold detector 72 to become high, as FIG. 6c illustrates. This in turn causes a number of other changes that all take place around time $T_1$. First, the feedback through resistor 130 pulls the first threshold voltage 74 to zero volt so that the threshold detector 72 will be set up to detect the next zero crossing, as FIG. 6a illustrates. Second, since the inverted ABLANK signal 78 is not being low at this time, since flip-flop 80 had been set by the TRANSMIT signal 68, and since the range-gate signal 70 has ended, the outputs of gates 76 and 82 both go high. That is, the VALID signal on line 86 goes high, as FIG. 6d indicates, to trigger the gate generator 88 and thereby start the sample signal on line 32, as FIG. 6 indicates. The VALID signal on line 86 remains in a high state until the threshold detector 72 detects the next positive-going zero crossing and returns its output, depicted by FIG. 6c, to a low state.

The sample signal 32 is asserted for a predetermined duration, namely, $T_2 - T_1$, as FIG. 6e indicates. During this period, the error-voltage generator 30 samples the amplified signal and then holds the value existing at time $T_2$, which marks the end of the predetermined period.

Since the VALID signal on line 86 remains high until $T_4$, the pulse from the delay generator 118 occurring at time $T_3$ passes through the AND gate 122 to trigger the window generator 124. As FIG. 6i illustrates, the window generator 124 responds by generating a high signal on its output line 124a for an interval that brackets the expected time of occurrence $T_4$ of the positive-going zero crossing. When the threshold detector 72 detects a positive-going zero crossing, the VALID signal on line 86 switches to a low state, which, because of inverter 128, enables AND gate 126, whose output on line 127 is depicted in FIG. 6j. If the positive-going zero crossing occurs while the window-generator output is high, the signal on the output line 127 of AND gate 126 also changes to a high state, as FIG. 6j illustrates, and remains in that state until the output line 124a of the window generator 124 returns to a low state. The positive transition of the gate-126 output triggers flip-flop 80, which stops the counter 10, and the subsequent negative transition of the gate-126 output triggers the pulse generator 90, which starts a memory cycle during which a revised AGC value is stored in the RAM.

If the first positive-sloped zero crossing of the amplified signal does not occur when expected—that is, if it occurs outside the window—then the output of AND gate 126 remains low. Thus, the counter will not be stopped until the OVERFLOW signal is generated, and the memory cycle will not occur. In that case, the detected signal is treated as a bad signal and is essentially ignored.

The flow meter embodying the invention can monitor the flow rates on more than one set of transducers without manual recalibration of the receiver for each transducer pair. The AGC circuit in the receiver automatically establishes the proper calibration for each set of transducers by determining and then storing in the RAM the separate AGC value necessary to yield an amplified signal of a desired amplitude in each path. The time-varying-gain component of the gain-control signal reduces the dynamic range required of the AGC circuit and substantially increases the adaptability of the receiver to transducer pairs having widely differing amounts of signal attenuation. Since the calibration for each path is set automatically and then stored as a unique AGC value for the path, the receiver can respond to changes in the fluid composition without operator intervention. Moreover, the stored AGC value provides a direct and useful indicator of the change in the attenuation characteristics of the fluid stream. Visual display of the stored AGC value indicates to the operator whether other materials or contaminants have been introduced into the fluid stream and may also provide a measure of the amount of material added.

In battery-powered flow meters the stored AGC values offer a significant advantage over other approaches. Because battery life is limited, it is desirable to power down the receiver when flow-meter readings are not being taken, but conventional AGC arrangements require significant time and energy to re-establish the AGC level and make a new reading when power is again applied to the receiver. At the cost of only minimal power for the memory between readings, the present arrangement maintains the stored AGC values so that they are available when power is reapplied to the receiver. This eliminates the need to reestablish the AGC value, and it thereby reduces the time and energy necessary to make the next reading.

In addition, the noise-control function of the circuit makes it possible to operate the receiver in environments that may be too noisy for more-conventional flow meters. The receiver responds to noise occurring during the range gate by systematically and gradually reducing the gain of the amplifier until the noise is below the threshold voltage. By reducing the gain in this manner, the receiver is more likely to continue being able to detect received signals in a noisy environment. Although it will not provide meaningful AGC values during periods of noise, the circuit quickly reestablishes a stable AGC value soon after the noise has ended.

It is apparent in light of the embodiment of the invention described above that various alterations, modifications, and improvements will readily occur to those skilled in the art. Such obvious alterations, modifications, and improvements, though not expressly described above, are nonetheless intended to be implied and are within the spirit and scope of the invention. Accordingly, the foregoing discussion is intended to be illustrative only, and not limiting; the invention is limited and defined only by the following claims and equivalents thereto.

What is claimed as new and desired to be secured by Letters Patent of the United States is:

1. A flow meter comprising:
    (A) a plurality of sonic transducers, at least a plurality of which are operable as transmitting transducers and at least a plurality of which are operable as receiving transducers, transducers, each of the transmitting transducers being operable to transmit sonic pulses along a different sonic path associated therewith through a fluid to an associated receiving transducer, each receiving transducer responding to the reception of a sonic pulse to generate a transducer output representative thereof;
    (B) a driver for alternately driving each transmitting transducer individually to transmit sonic pulses along the sonic path associated therewith, each sonic pulse transmission defining the beginning of a new cycle of operation;
    (C) an amplifier, having an output port, a gain-control port adapted to receive a gain-control signal, and an input port adapted to receive an amplifier input, for amplifying the amplifier input with a gain determined by the gain-control signal to generate an amplifier output;
    (D) means for selectively coupling the amplifier input port to receive the transducer output of the receiving transducer associated with the sonic path associated with the transmitting transducer currently being driven by the driver;
    (E) an AGC circuit responsive to the amplified signal to generate therefrom an AGC signal representing an AGC value associated with the path taken by the sonic pulse from which the amplified signal resulted;
    (F) memory means responsive to the AGC signal to store the AGC value represented thereby separately from each AGC value associated with another path;
    (G) means for (i) retrieving from the memory means, for use during a given cycle of operation in which the driver drives a given transmitting transducer, the AGC value represented by the AGC signal during a previous cycle in which the driver drove the given transmitting transducer and (ii) generating a retrieved-value signal from the retrieved AGC value;
    (H) a TVG circuit for generating a TVG signal that changes monotonically during a time interval between the time at which the driver sends a pulse and the time at which a receiving transducer receives it;
    (I) gain-control means responsive to the retrieved-value signal for generating a gain-control signal dependent thereon and applying the gain-control signal to the gain-control port of the amplifier during the given cycle of operation, the gain-control means also being responsive to the TVG signal so that the gain-control signal depends on both the TVG signal and retrieved-value signal; and
    (J) measurement means responsive to the amplifier output for measuring the time intervals between transmission of sonic pulses and reception thereof, for comparing the time intervals for different paths, for computing therefrom the flow rate of the fluid flowing through the paths, and for generating an indication of the flow rate.

2. A flow meter as defined in claim 1 wherein the amplitude of the gain-control signal generated by the gain-control means is proportional to the sum of values proportional to the amplitudes of the retrieved-value signal, the TVG signal, and a constant.

3. A sonic flow meter comprising:
    (A) a plurality of sonic transducers, at least a plurality of which are operable as transmitting transducers and at least a plurality of which are operable as receiving transducers, each of the transmitting transducers being operable to transmit sonic pulses along a sonic path associated therewith through a fluid to an associated receiving transducer, each receiving transducer responding to the reception of a sonic pulse to generate a transducer output representative thereof.
    (B) a driver for driving a transmitting transducer to transmit sonic pulses of a predetermined frequency along the sonic path associated therewith;
    (C) an amplifier, connected to receive a transducer output, for amplifying the transducer output to produce an amplified signal therefrom;
    (D) a first zero-cross detector for monitoring the amplified signal and generating a first crossing signal when the amplified signal crosses from a first polarity to an opposite polarity;
    (E) a second zero-cross detector for monitoring the amplified signal and generating a second crossing signal when the amplified signal crosses back from the opposite polarity to the first polarity;
    (F) a window generator responsive to the first and second crossing signals for establishing a time window that brackets a point in time delayed by one-half cycle of the predetermined frequency from a zero crossing detected by the first zero-cross detector and generating a receive signal in response to the second crossing signal only if the second crossing signal occurs during the time window; and
(G) processing means for measuring the time between the sound transmission and the receive signal for a plurality of paths, computing therefrom the flow rate of the medium, and producing an indication thereof.

4. A flow meter comprising:
(A) a plurality of sonic transducers, at least a plurality of which are operable as transmitting transducers and at least a plurality of which are operable as receiving transducers, each of the transmitting transducers being operable to transmit sonic pulses along a different sonic path associated therewith through a fluid to an associated receiving transducer, each receiving transducer responding to the reception of a sonic pulse to generate a transducer output representative thereof;
(B) a driver for alternately driving each transmitting transducer individually to transmit sonic pulses along the sonic path associated therewith, each sonic pulse transmission defining the beginning of a new cycle of operation;
(C) an amplifier, having an output port, a gain-control port adapted to receive a gain-control signal, and an input port adapted to receive an amplifier input, for amplifying the amplifier input with a gain determined by the gain-control signal to generate an amplifier output;
(D) means for selectively coupling the amplifier input port to receive the transducer output of the receiving transducer associated with the sonic path associated with the transmitting transducer currently being driven by the driver;
(E) an AGC circuit responsive to the amplified signal to generate therefrom an AGC signal representing an AGC value associated with the path taken by the sonic pulse from which the amplified signal resulted;
(F) memory means responsive to the AGC signal to store the AGC value represented thereby separately from each AGC value associated with another path;
(G) means for (i) retrieving from the memory means, for use during a given cycle of operation in which the driver drives a given transmitting transducer, the AGC value represented by the AGC signal during a previous cycle in which the driver drove the given transmitting transducer and (ii) generating a retrieved-value signal from the retrieved AGC value;
(H) gain-control means responsive to the retrieved-value signal for generating a gain-control signal dependent thereon and applying the gain-control signal to the gain-control port of the amplifier during the given cycle of operation;
(I) measurement means responsive to the amplifier output for measuring the time intervals between transmission of sonic pulses and reception thereof, for comparing the time intervals for different paths, for computing therefrom the flow rate of the fluid flowing through the paths, and for generating an indication of the flow rate;
(J) a noise detector, responsive to the amplifier output, for determining whether the amplifier output, during a predetermined time interval before a receiving transducer is expected to receive a pulse from a given path, exceeds a predetermined threshold and for generating a noise signal if it does; and
(K) means responsive to the noise signal to store in the memory, in place of the current value associated with the given path, a value that represents a lower gain.

* * * * *